(12) United States Patent
Khandual

(10) Patent No.: US 7,934,128 B2
(45) Date of Patent: Apr. 26, 2011

(54) METHODS, SYSTEMS AND COMPUTER PROGRAM PRODUCTS FOR FAULT TOLERANT APPLICATIONS

(75) Inventor: Anshuman Khandual, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/133,627

(22) Filed: Jun. 5, 2008

(65) Prior Publication Data
US 2009/0307471 A1 Dec. 10, 2009

(51) Int. Cl.
G06F 11/00 (2006.01)
(52) U.S. Cl. .................................. 714/38; 714/3; 714/47
(58) Field of Classification Search ........................ None
See application file for complete search history.

(56) References Cited

U.S. PATENT DOCUMENTS

| | | | |
|---|---|---|---|
| 5,740,359 A | | 4/1998 | Hasegawa et al. |
| 5,784,549 A | * | 7/1998 | Reynolds et al. ............... 714/24 |
| 6,477,629 B1 | * | 11/2002 | Goshey et al. ................ 711/162 |
| 6,625,751 B1 | | 9/2003 | Starovic et al. |
| 6,948,099 B1 | * | 9/2005 | Tallam ............................ 714/38 |
| 7,096,381 B2 | * | 8/2006 | Largman et al. ................ 714/20 |
| 7,337,358 B2 | * | 2/2008 | Jones et al. ..................... 714/15 |
| 7,702,907 B2 | * | 4/2010 | Vaha-Sipila et al. .......... 713/166 |
| 2003/0065970 A1 | | 4/2003 | Kadam |
| 2005/0177776 A1 | * | 8/2005 | Kim et al. ....................... 714/38 |
| 2008/0126447 A1 | * | 5/2008 | Jones et al. ................... 707/204 |

OTHER PUBLICATIONS

Yen et al., "Implementation of a Customizable Fault Tolerance Framework", The First IEEE International Symposium on Object-Oriented Real-Time Distributed Computing.
Improving System Dependability with Functional Alternatives, [online]; [retrieved May 12, 2008]; retrieved from the Internet http://www.ece.cmu.edu/~koopman/roses/dsn04/shelton04_functional_alternatives.pdf.
Towards Operating System Support for Application-Specific Fault-Tolerance Protocols, [online], [retrieved May 12, 2008]; retrieved from the Internet http://www.ertos.nicta.com.au/publications/papers/Ryzhyk_K_06.pdf.
Software Bugs, [online]; [retrieved on May 12, 2008]; retrieved from the Internet http://srel.ee.duke.edu/software_bugs.htm.

* cited by examiner

*Primary Examiner* — Christopher S McCarthy
(74) *Attorney, Agent, or Firm* — Garg Law Firm, PLLC; Rakesh Garg; Libby Z. Toub

(57) ABSTRACT

Methods, systems and computer program products for architecting fault tolerant applications. Embodiments of the invention include a method for executing an application in a computer system, the method including monitoring a behavior of the computer system, the computer system having a subsystem in an operating system of the computer system, in response to encountering a problem in the computer system, performing switching the application from a normal mode of operation to a critical mode of operation, executing the application in the critical mode of operation, determining if the computer system has returned to the normal mode of operation, in response to the computer system returning to the normal mode of operation switching the application to execute in the normal mode and executing the application in the normal mode of operation.

20 Claims, 5 Drawing Sheets

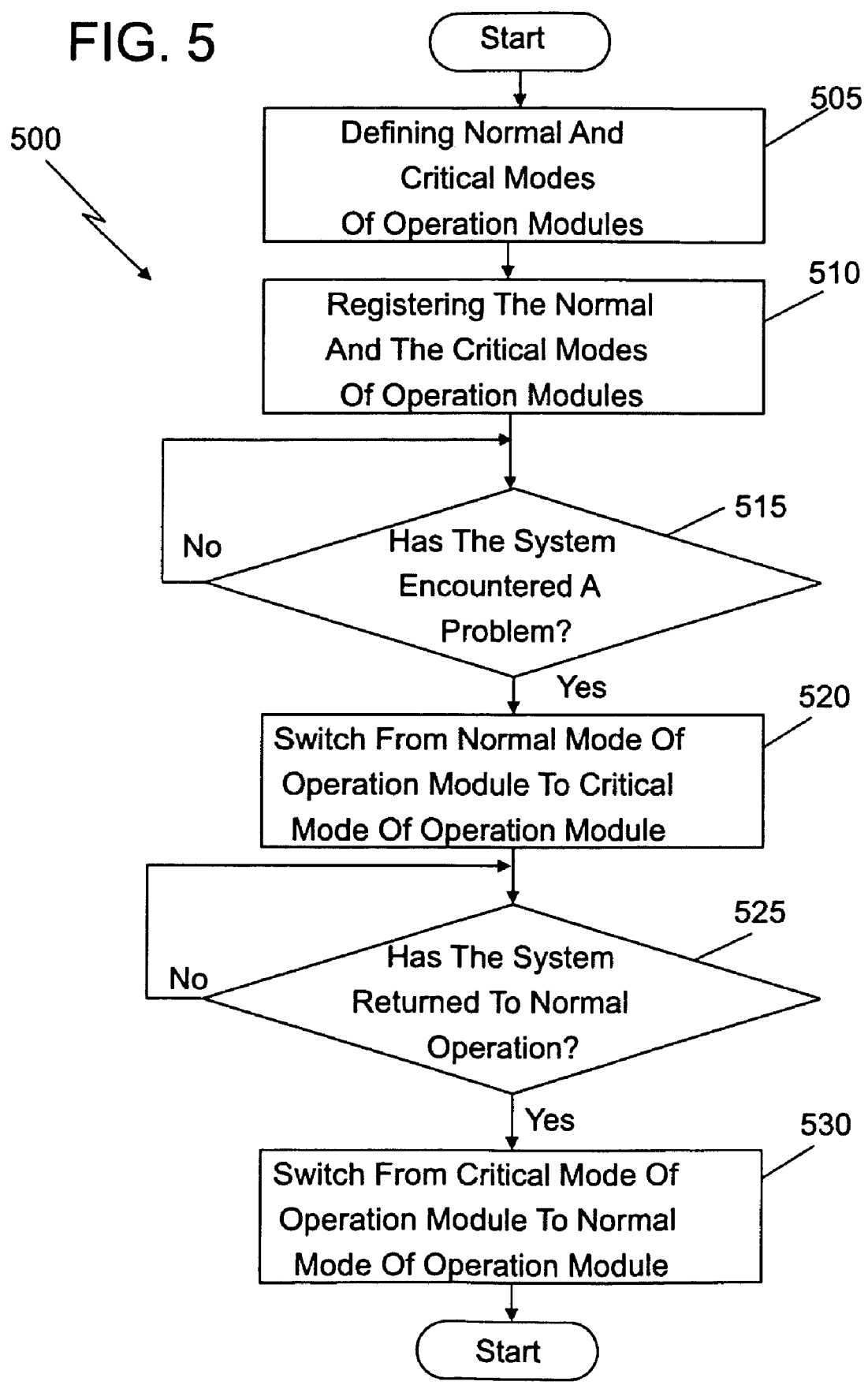

METHODS, SYSTEMS AND COMPUTER PROGRAM PRODUCTS FOR FAULT TOLERANT APPLICATIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to fault tolerant systems, and particularly to methods, systems and computer program products for architecting fault tolerant applications.

2. Description of Background

Fault-tolerance is a computer system property that enables the system to continue operating properly in the event of the failure of some of its components. As such, if the system's operating quality decreases at all, the decrease is proportional to the severity of the failure. Typically, fault tolerance is achieved by generic techniques which apply to all the applications running on the system. Such techniques may include: a disaster recovery system; fault tolerant system software; kernel support for fault tolerance; and hardware support for fault tolerance.

However, currently existing solutions to fault tolerance behave in a generic way to handle the system's fault. Currently, an application program relies on generic methods of fault tolerance, such as on the underlying operating system and firmware to save itself when a problem occurs in the system. As such, the application program specifically can't do anything to tolerate the fault. For example, suppose an application program uses an Ethernet card for network connection. After some time the Ethernet card does not work properly. Typically, the OS fails over to a new (redundant) Ethernet card and gives the new Ethernet card the same identity as the failed Ethernet card. This operation happens transparently to the application program. The application program keeps on running even in the event of an Ethernet card failure. Here, the fault tolerance is provided to all the applications running on the system. This method of handling the fault it a generic one irrespective of type of application programs.

As such, an application programmer for the system is left with no option other than to rely on the generic mechanism to handle the fault for the application. In addition, the application programmer has no way of designing a better way of handling the fault for what the application programmer believes to be more appropriate in the context of the particular application. It would be desirable to have a fault tolerant system to enable the application programmer with some programming structures which help in designing better way of handling the fault for the application without blindly relying on the generic solutions.

BRIEF SUMMARY

Embodiments of the invention include a method for executing an application in a computer system, the method including monitoring a behavior of the computer system, the computer system having a subsystem in an operating system of the computer system, in response to encountering a problem in the computer system, performing switching the application from a normal mode of operation to a critical mode of operation, executing the application in the critical mode of operation, determining if the computer system has returned to the normal mode of operation, in response to the computer system returning to the normal mode of operation switching the application to execute in the normal mode and executing the application in the normal mode of operation.

Additional embodiments include a computer program product for executing an application in a computer system, the computer program product including a tangible storage medium readable by a processing circuit and storing instructions for execution by the processing circuit for performing a method including monitoring a behavior of the computer system, the computer system having a subsystem in an operating system of the computer system in response to encountering a problem in the computer system, performing switching the application from a normal mode of operation to a critical mode of operation, executing the application in the critical mode of operation, determining if the computer system has returned to the normal mode of operation, in response to the computer system returning to the normal mode of operation switching the application to execute in the normal mode and executing the application in the normal mode of operation.

Further embodiments include a system for executing an application, the system including a processor, an operating system operatively coupled to the processor and a subsystem residing in the operating system, wherein the subsystem is configured to monitor problems in the system and notify the application of normal and critical modes of operation on the system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, technically we have achieved a solution which provides the ability to handle a system fault or any critical condition for his application without relying on the generic techniques. An application programmer can explicitly write code for handling fault which is more suitable for his application rather than relying on a generic technique, which improves the programmer's control of the application behavior. As fault tolerance is application specific, the systems and methods described herein uses resources sufficient for the application to handle the fault. But in case of generic techniques of handling fault, the system uses more resources by taking more precautions and applying more methods which is generic in nature and more than what the particular application needs to handle a critical situation. This paradigm reduces the cost of handling critical conditions. Application specific fault tolerance is more efficient, finer grained and more robust than any generic method of fault tolerance.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 illustrates a flow chart of a method for running an application in accordance with exemplary embodiments.

Figure 1:
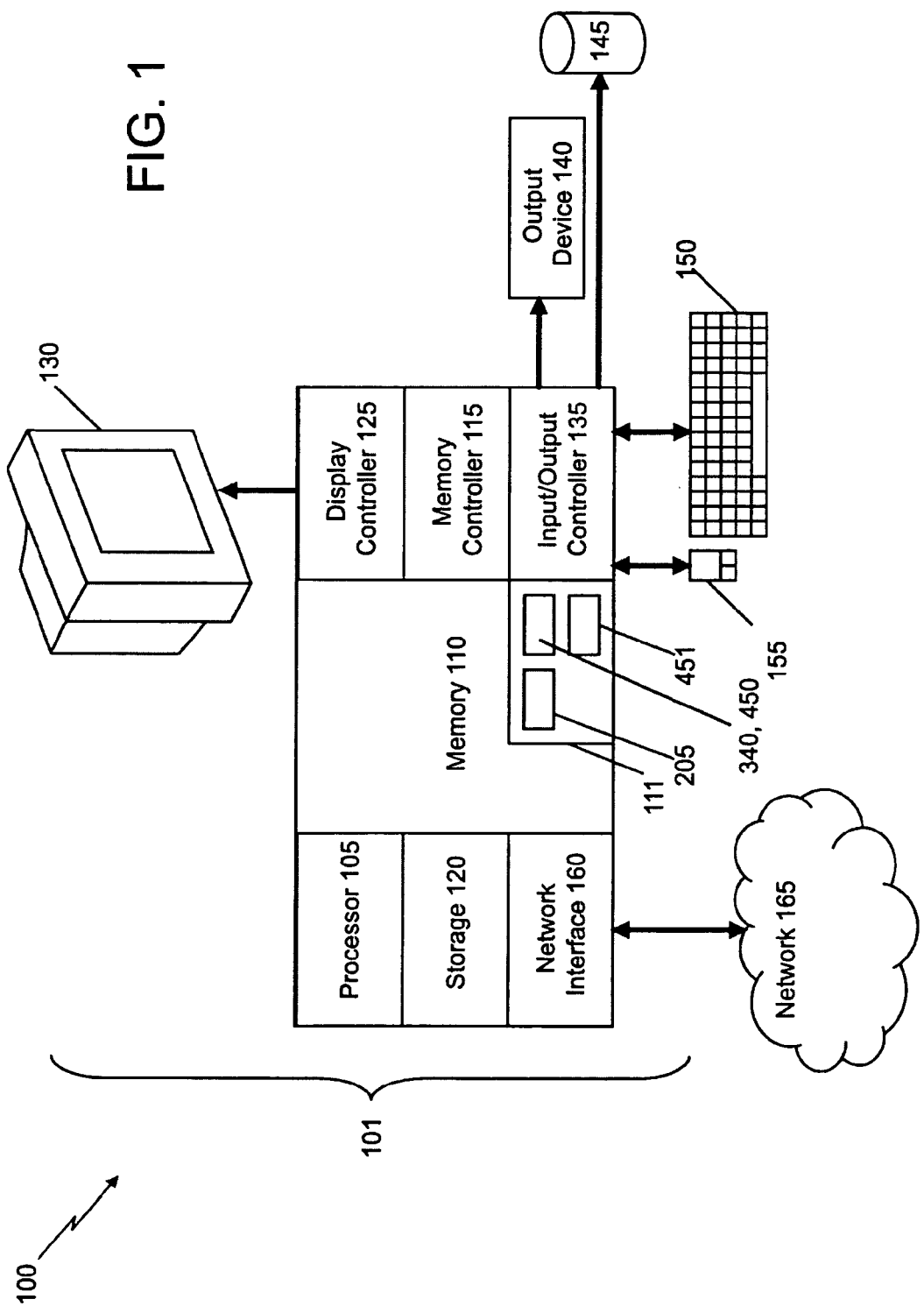
FIG. 1 illustrates an exemplary embodiment of a system for architecting fault tolerant applications.

The detailed description explains the preferred embodiments of the invention, together with advantages and features, by way of example with reference to the drawings.

DETAILED DESCRIPTION

Exemplary embodiments include systems and methods that provide an application programmer the control of deciding how to handle a particular critical condition or fault for an application. In exemplary embodiments, the application programmer writes or defines two types of modules for the same functionality. One module is a normal module that defines the functionality for a system that is operating in a usual and expected manner. The second type of module is a critical version of the normal module designed for some particular types of critical conditions. The second type of module is functionally equivalent to the first type, but fault tolerant, and operates in the critical mode. When a critical fault in the computer system occurs, the application switches from the normal mode of operation to the critical mode of operation, and switches back to the normal mode of operation when the critical fault has been resolved. In exemplary embodiments, the system can implement application programming interfaces (APIs) to switch the application program between the normal mode and the critical mode of operation. This paradigm provides the application programmer the control of deciding how to deal with critical conditions of the system for his application without relying upon the generic fault tolerant system software or any such generic techniques.

In exemplary embodiments, the application programmer defines the functionality in the critical versions of the modules assuming that system's condition is critical and faults and other failures can occur any time during the system's operation. In exemplary embodiments, the application programmer takes extra precautions while writing the steps of the functionality. The programming structure reflects a more "play safe" approach unlike the normal module which defines the same function in a usual way. In exemplary embodiments, the application programmer registers both the kinds of modules of the same functionality with a new subsystem (e.g., named "Critical_Watch"). The subsystem notifies the applications (while executing) about the criticalness of the system. In exemplary embodiments, applications include notification handlers for these kinds of notifications from the new subsystem. In exemplary embodiments, upon receiving the notification, a handler replaces the normal module with the critical version of the module defined for the particular critical condition of the system for the same functionality. Now, the application program runs (in the critical condition of the system) the critical version of the functionality defined specially for the critical condition of the system. In this way, the application attains robustness or reliability in that critical condition of the system. The "Critical_Watch" subsystem notifies the application when the system is back to normal condition. That time, the application restores the modules replacing the critical version module with the normal version module of the same functionality. Therefore, the application runs the normal version or usual version of the functionality in the normal conditions of the system.

FIG. 1 illustrates an exemplary embodiment of a system 100 for architecting fault tolerant applications. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the fault tolerant architecting methods described herein in accordance with exemplary embodiments and a suitable operating system (OS) 111. The operating system 111 essentially controls the execution of other computer programs, such the fault tolerant architecting systems and methods described herein, and provides scheduling, input-output control, file and data management, memory management, and communication control and related services.

The fault tolerant architecting methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the fault tolerant architecting methods can be written as an object oriented programming language, which has classes of data and methods, or a procedure programming language, which has routines, subroutines, and/or functions. As further described herein, the OS 111 can include a subsystem 205 that monitors for problems in the computer 101. The subsystem 205 is in communication with one or more applications 340, 450 (as further described herein), each of which can include an exemplary application programming interface 451.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The fault tolerant architecting methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The fault tolerant architecting methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the fault tolerant architecting methods are implemented in hardware, the fault tolerant architecting methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As discussed above, the exemplary fault tolerant application program provides the application programmer a new paradigm of defining different versions of code for the same functionality under different fault circumstances. A particular version of code replaces any existing version in run time when the "Critical_Watch" subsystem detects that particular circumstance is prevailing in the system. Hence, the application programmer retains full control of defining fault tolerant versions of code that the application programmer considers being the best under some fault condition. As such, fault tolerance efforts are internal to the application program and controlled by application programmer. However, fault tolerance is not transparent to the application programs. In alternate exemplary embodiments, transparency of fault tolerance is a paradigm of building application programs in which the application programmer embeds fault tolerance in different versions of same functionality in the application program itself.

The systems and methods described herein therefore provide a more fine grained approach towards fault tolerance. A particular "functionality" (as fine grained as routine in a program) is replaced by its fault tolerant version, both of them defined by the application programmer. In exemplary embodiments, the systems and methods described herein provide "programming and building" fault tolerant applications that implement an application internal effort to achieve fault tolerance. Furthermore, the systems and methods described herein provide enhanced control of the application programmer over behavior of the application program towards fault condition of the system without depending upon the generic system software. As such, the systems and methods described herein provide an application with specific ways to handle fault tolerance in contrast to a generalized generic approach to handle the fault. Furthermore, no external subsystem is needed to achieve fault tolerance for the application. Finally, the systems and methods described herein replace different versions of same functionality in different fault conditions in run time to incorporate fault tolerance to that particular fault condition in an application program.

Figure 2:
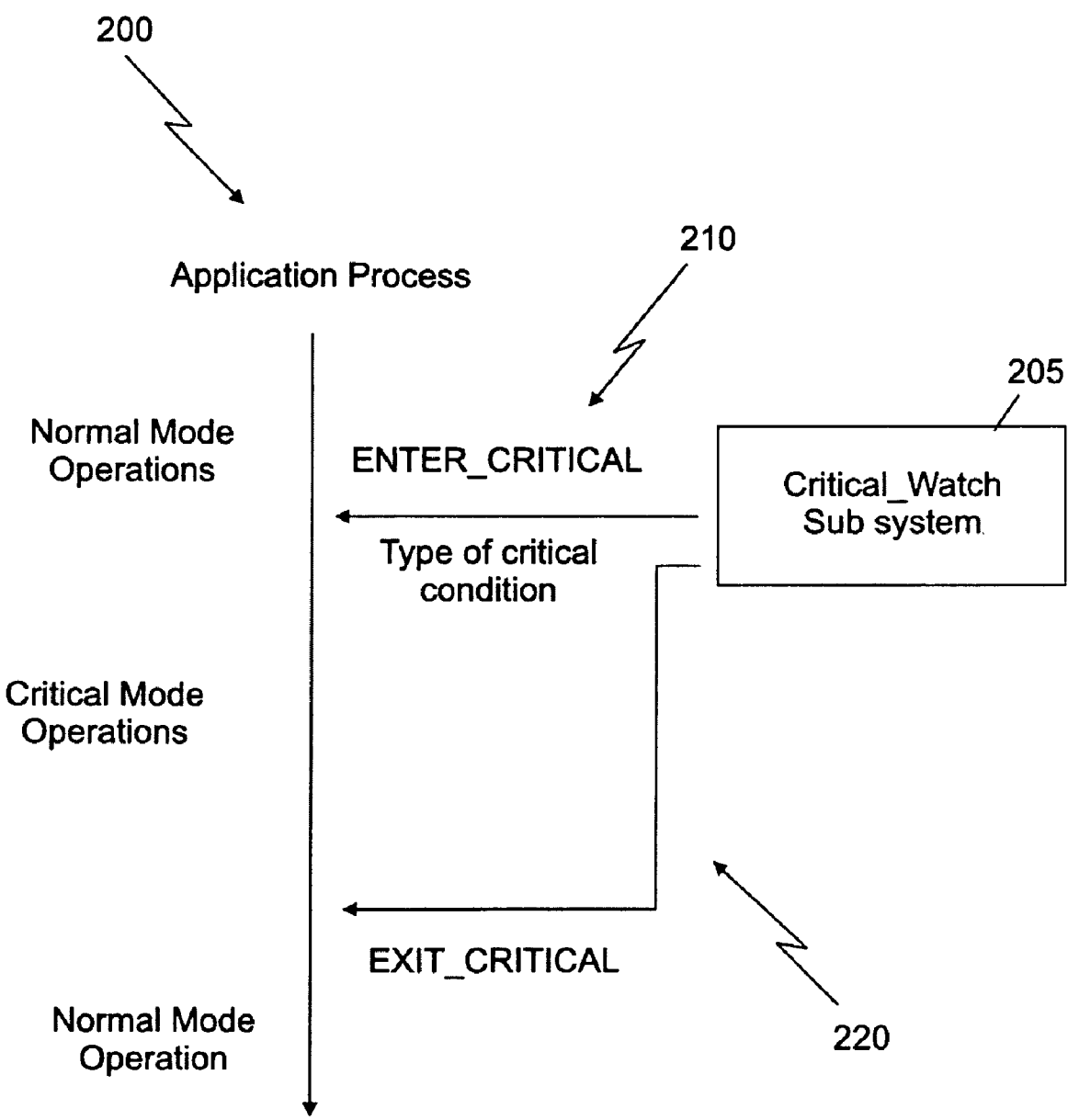
FIG. 2 illustrates a process flow diagram of an example of a system changing from a normal mode operation to a critical mode operation in accordance with exemplary embodiments.

FIG. 2 illustrates a process flow diagram 200 of an example of a system changing from a normal mode operation to a critical mode operation in accordance with exemplary embodiments. As discussed above, exemplary embodiments include a new subsystem 205 (e.g., "Critical Watch") that is implemented in the operating system and analyzes the system 100 behavior for any potential critical condition. When the subsystem 205 is assured that the system's condition is critical then the subsystem notifies the applications about the same through a signal 210 (e.g., ENTER_CRITICAL) that takes the applications to a critical mode of operation. In exemplary embodiments, the applications are registered to the subsystem for related to the fault tolerance service. When the subsystem finds that system is now in normal condition, then the subsystem sends out another signal 220 (e.g., EXIT_CRITICAL) to all the applications, so that the applications can return to a normal mode of operation. In exemplary embodiments, the subsystem also communicates the applications regarding the type of the critical conditions of the system.

Figure 3:
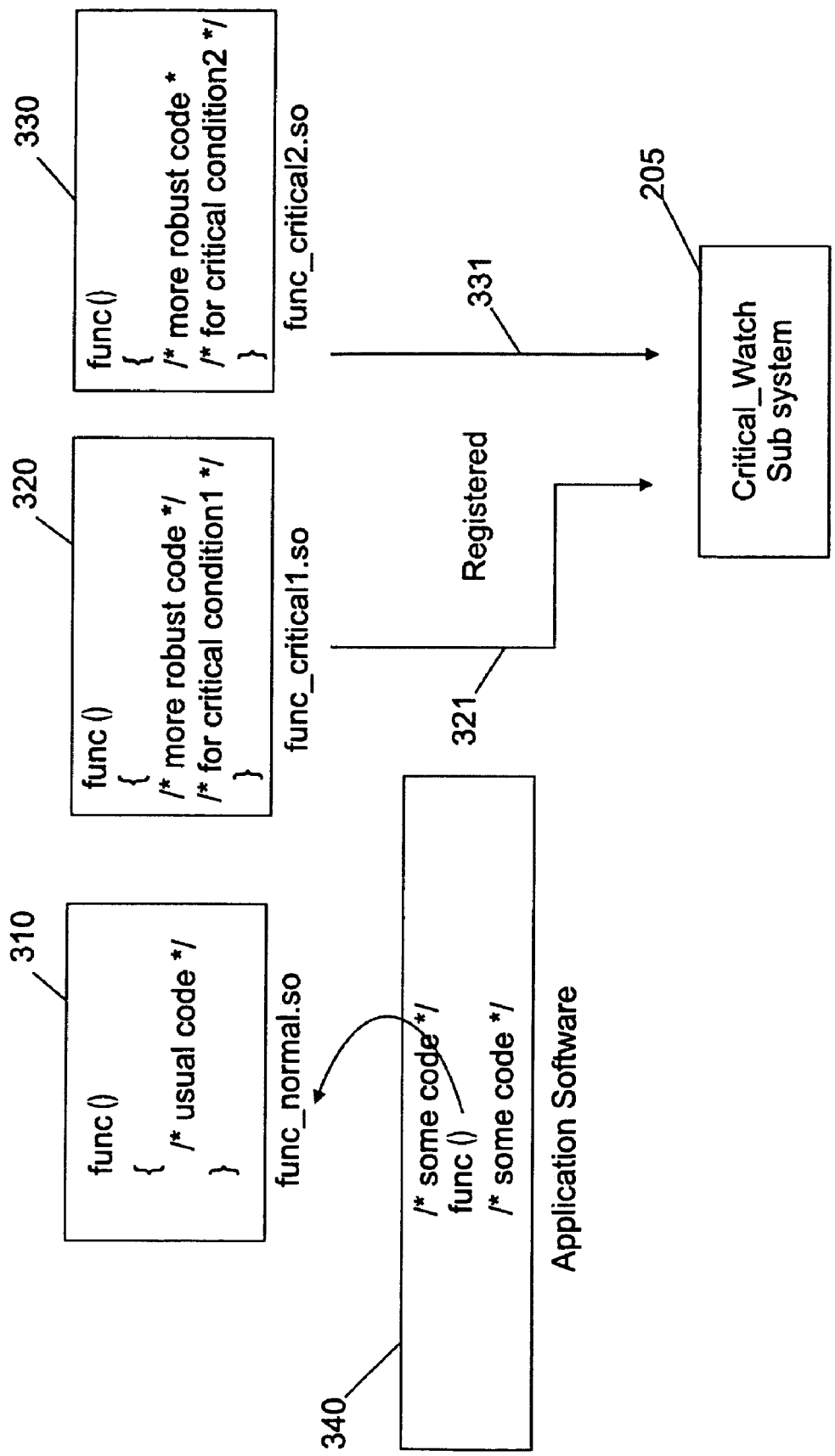
FIG. 3 illustrates application modules for normal and critical modes of operation for a system in accordance with exemplary embodiments.

FIG. 3 illustrates application modules for normal and critical modes of operation for a system in accordance with exemplary embodiments. In exemplary embodiments, the application programmer defines two types of modules for the same functionality (i.e., normal version module and a critical version module). As such, for a single functionality there can be a normal module 310, a critical module 320 for critical condition1, a critical module 330 for critical condition2, one module for critical condition3 and so on. Each of the critical modules 320, 330 is registered with the "Critical_Watch" subsystem 205 for the respective critical conditions of the system 100, as indicated by paths 321, 331. Therefore, as an application 340 is running in a "normal mode" the application 340 operates with the normal module 310. If the subsystem 205 determines that the application 340 has experienced a fault, the subsystem notifies the application 340 of the fault and fault type and the application 340 can then implement the appropriate critical module 320, 330 depending on the fault type.

Figure 4:
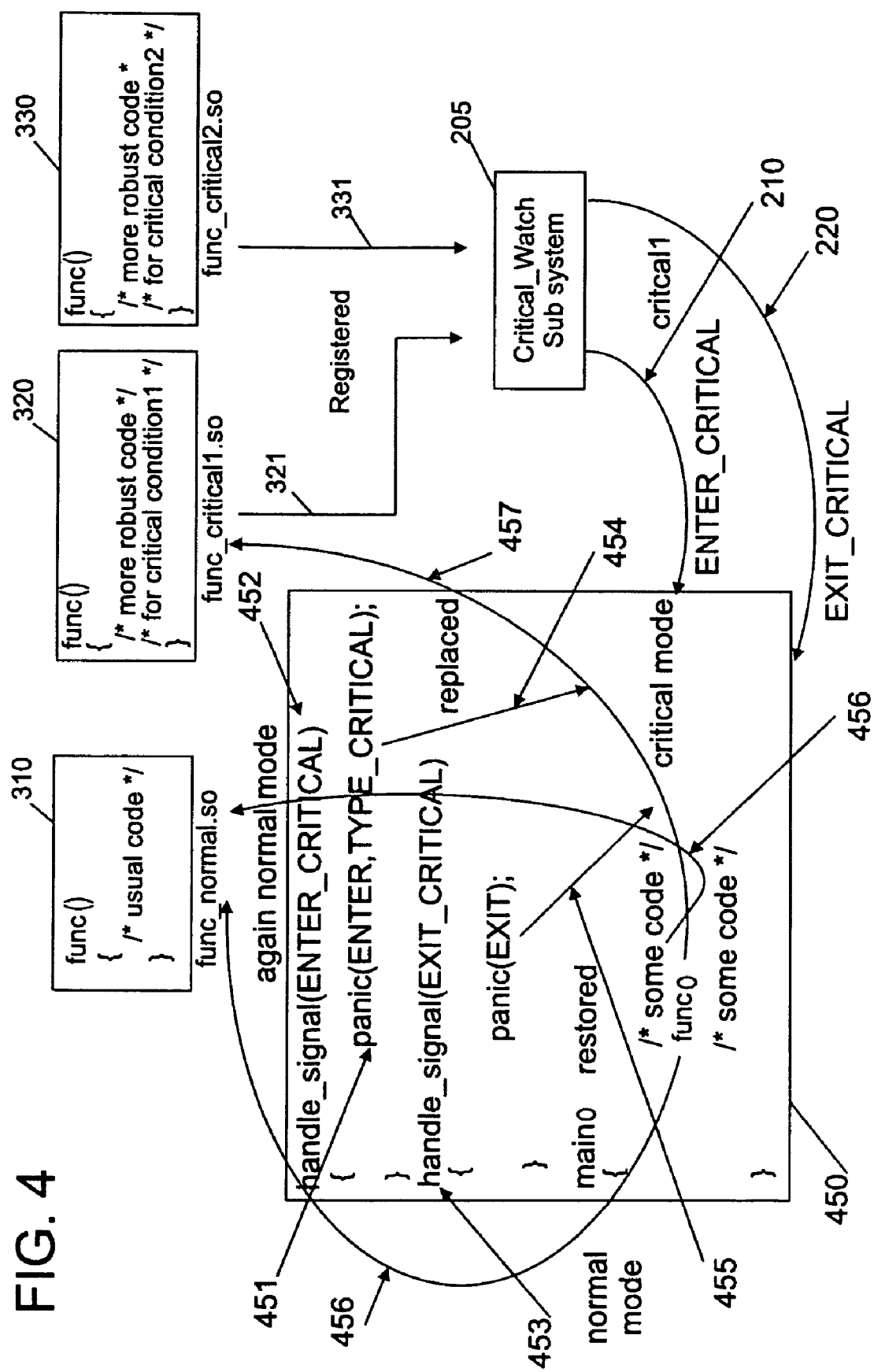
FIG. 4 illustrates modules for normal and critical modes of operation for a system via an API in accordance with exemplary embodiments.

FIG. 4 illustrates modules for normal and critical modes of operation for a system via an API in accordance with exemplary embodiments. In exemplary embodiments, the new API 451 (e.g., named "panic") is introduced and is responsible for taking the application 450 to a critical mode of operation via path 454, via one of the critical modules 320, 330 during critical condition and returning the application 450 to normal mode via the normal module 310 when the condition of the system 100 becomes normal via path 455. Paths 456 illustrate the placement of the normal mode of operation module 310 into the application 450 and the path 457 illustrates the placement of the critical mode of operation module 320 into the application 450. The API 451 can replace the normal version module 310 of any functionality with a critical mode module 320, 330 (i.e., a version of the normal module 310) depending on the type of critical condition of the system 100. The type of the critical condition would have been passed to the application from the subsystem 205 (e.g., "Critical_Watch") when the subsystem 205 generated the signal 210 (e.g., ENTER_CRITICAL). The same signal 210 is passed the API 451.

In exemplary embodiments, the application program 450 defines two signal handlers 452, 453 for handling the signals 210, 220 (e.g., ENTER_CRITICAL and EXIT_CRITICAL), respectively. In the signal handler 452 for ENTER_CRITICAL, the application 450 calls the API 451 (e.g., "panic") to replace all the intended normal modules (e.g., normal module 310) with its critical versions (e.g., modules 320, 330) depending on the type of critical condition. In the signal handler 453 for EXIT_CRITICAL, the application 450 calls the API 451 to return the normal modules (e.g., module 310) back into their positions within the application 450.

FIG. 5 illustrates a flow chart of a method 500 for running an application in accordance with exemplary embodiments. At block 505, the application programmer can define both normal mode of operation and critical mode of operation modules within the application. Furthermore, as discussed above, the system can include a subsystem into which the normal and critical modes of operation modules can be registered at block 510. As further described above, the subsystem includes signals that the subsystem sends to the application to notify the application of both normal and critical modes of operation of the system. Similarly, the application includes signal handlers for receiving the signals and calling an application programming interface to place the normal and critical modes of operation modules in the application during normal and critical modes of operation respectively. At block 515, the subsystem monitors behavior of the system. If at block 515, the subsystem does determine that a problem has occurred, then the application is switched from a normal mode of operation to a critical mode of operation at block 520. As described above, when the subsystem encounters a critical mode of operation, the subsystem sends a signal to the application notifying the signal handler that the application should enter the critical mode of operation. The signal handler calls the application programming interface to place to pace the critical mode of operation module in the application. The application runs in the critical mode of operation until the subsystem determines that the system has returned to the normal mode of operation at block 525. If the system has returned to a normal mode of operation at block 525, then at block 530, the application is switched from the critical mode of operation to the normal mode of operation. As described above, when the subsystem determines that the system is running normally, the subsystem sends a signal to the application notifying the signal handler that the application should enter the normal mode of operation. The signal handler calls the application programming interface to place the normal mode of operation module in the application. It is appreciated that the flow repeats itself, thereby monitoring the system for problems.

EXAMPLE

Consider the following as an example of a simple application program:

```
While (true)
{
    /*Code*/
    Func( );        //resolved from func.so module
    /*Code*/
}
```

The module func( ) can contain a majority of the functionality what the application program delivers. The routine func( ) is resolved from a module func.so that defines it.

In addition, func( ) is defined as follows in the module func.so:

---
func.so
---
```
Func( )
{
    /*Code*/
    Write(file, buf[100]);        //writing to a file
    /*Code*/
}
```
---

Suppose now that the system is in a critical condition in which the hard drive in not responding properly. In that scenario, "write(file, buf[100])" does not guarantee writing that buffer into the file. Therefore, in this critical condition of the system when hard drive is not responding the functionality of the application program is not reliable and robust.

As per the systems and methods described herein, the application programmer defines the same routine in a different module named func_critical.so. The definition of func( ) in func_critical.so can be as follows:

---
func_critical.so
---
```
func( )
{
    /* some code */
JUMP:
    write(file, buf[100]);          //writing to a file
    buf_tmp[100] = read(file);      //reading from that file
    rc = compare (buf, buf_tmp);    //compare contents of both the buffers
    if( rc != 0)                    // if contents are not the same
    {
        sleep(100);                 //wait for some time
        goto JUMP;                  // try writing into the file till it
                                    succeeds
    }
    /* some code */
}
```
---

This critical definition of func( ) does not proceed further, until the time it is assured that it has written the data to the file properly. In addition, this version of func( ) definition is more robust and reliable when the hard drive is in critical condition than the previous one. Here, the application programmer has defined a way of how to face the critical condition for the application. The module func_critical.so should also be registered to the subsystem "Critical_Watch" for the critical condition of the system when hard drive responds very slowly.

In addition, the application has two signal handlers, one for the signal ENTER_CRITICAL and the other for the signal EXIT_CRITICAL as follows:

---
Application program
---
```
handle_signal (ENTER_CRITICAL)
{
    /* some code */
    panic (ENTER, TYPE_CRITICAL); /TYPE_CRITICAL =
    hard drive
        /* some code */
```
---
Application program
---
```
}
Handle_signal (EXIT_CRITICAL)
{
    /* some code */
    panic (EXIT);
    /* some code */
}
While (true)
{
    /* some code */
    func( );          //resolved from func.so in normal condition
    /* some code */   //and from func_critical.so in critical condition
}
```
---

As such, when hard drive starts responding slower, then the "Critical_Watch" subsystem detects this slow response and sends the signal ENTER_CRITICAL to the application. The signal handler then catches the signal and invokes "panic", which, in turn, replaces func.so with func_critical.so. The application then starts running more reliable and robust definition of "func( )" than before with func.so. As such, the application attains fault tolerance to the hard drive problem of the system. When the system comes to the normal condition, then "Critical_Watch" sends EXIT_CRITICAL signal to the application. The signal handler again restores func.so and runs the normal definition of "func( )".

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for executing an application in a computer system, the method comprising:
   monitoring a behavior of the computer system, the computer system having a subsystem in an operating system of the computer system;
   in response to encountering a problem in the computer system, performing:
   switching the application from a normal mode of operation to a critical mode of operation using the subsystem in the operating system;
   executing the application in the critical mode of operation;
   determining if the computer system has returned to the normal mode of operation;
   in response to the computer system returning to the normal mode of operation, switching the application to execute in the normal mode of operation using the subsystem in the operating system; and
   executing the application in the normal mode of operation.

2. The method as claimed in claim 1, further comprising: identifying subsystem modules of the application configured to execute the application in the normal mode of operation and the critical mode of operation.

3. The method as claimed in claim 1, further comprising: sending a first signal to the application, the first signal notifying the application that the problem has occurred in the computer system.

4. The method as claimed in claim 3, wherein a first signal handler receives the first signal and calls an application program interface to replace a normal mode of operation module with a critical mode of operation module.

5. The method as claimed in claim 1, further comprising: sending a second signal to the application, the second signal notifying the application that the computer system has returned to the normal mode of operation.

6. The method as claimed in claim 5, wherein a second signal handler receives the second signal and calls an application program interface to replace a critical mode of operation module with a normal mode of operation module.

7. The method as claimed in claim 1, wherein switching between the normal mode of operation and the critical mode of operation is performed via an application program interface.

8. The method as claimed in claim 7, wherein the application program interface switches execution of the application from the normal mode of operation to the critical mode of operation and from the critical mode of operation to the normal mode of operation by calling a module responsible for execution in a specific mode of operation.

9. A computer program product for executing an application in a computer system, the computer program product comprising:
   a tangible storage medium readable by a processing circuit and storing instructions for execution by the processing circuit for performing a method comprising:
   monitoring a behavior of the computer system, the computer system having a subsystem in an operating system of the computer system;
   in response to encountering a problem in the computer system, performing:
   switching the application from a normal mode of operation to a critical mode of operation using the subsystem in the operating system;
   executing the application in the critical mode of operation;
   determining if the computer system has returned to the normal mode of operation;
   in response to the computer system returning to the normal mode of operation, switching the application to execute in the normal mode of operation using the subsystem in the operating system; and
   executing the application in the normal mode of operation.

10. The computer program product as claimed in claim 9, further comprising:
    identifying subsystem modules of the application configured to execute the application in the normal mode of operation and the critical mode of operation.

11. The computer program product as claimed in claim 9, wherein the method further comprises: sending a first signal to the application, the first signal notifying the application that the problem has occurred in the computer system.

12. The computer program product as claimed in claim 11, wherein a first signal handler receives the first signal and calls an application program interface to replace a normal mode of operation module with a critical mode of operation module.

13. The computer program product as claimed in claim 9, wherein the method further comprises: sending a second signal to the application, the second signal notifying the application that the computer system has returned to the normal mode of operation.

14. The computer program product as claimed in claim 13, wherein a second signal handler receives the second signal and calls an application program interface to replace a critical mode of operation module with a normal mode of operation module.

15. The computer program product as claimed in claim 9, wherein switching between the normal mode of operation and the critical mode of operation is performed via an application program interface.

16. The computer program product as claimed in claim 15, wherein the application program interface switches execution of the application from the normal mode of operation to the critical mode of operation and from the critical mode of operation to the normal mode of operation by calling a module responsible for execution in a specific mode of operation.

17. A system for executing an application, the system comprising:
    a processor;
    an operating system operatively coupled to the processor; and
    a subsystem residing in the operating system, wherein the subsystem is configured to monitor problems in the system and notify an application of normal and critical modes of operation on the system, wherein the subsystem is further configured to, in response to encountering a problem in the system, switch the application from a normal mode of operation to a critical mode of operation, execute the application in the critical mode of operation, and determine whether the system has returned to the normal mode of operation, and wherein the subsystem is further configured to, in response to the system returning to the normal mode of operation, switch the application to execute in the normal mode of operation, and execute the application in the normal mode of operation.

18. The system as claimed in claim 17, wherein the subsystem is configured to send signals to the application to notify the application of the normal mode of operation and the critical mode of operation on the system.

19. The system as claimed in claim 18, wherein the application includes signal handlers configured to receive the signals from the subsystem and further configured to call an application programming interface to switch the application in between the normal mode of operation and a critical mode of operation.

20. The system as claimed in claim 19, further comprising: a normal mode of operation module residing in the operating system and a critical mode of operation module residing in the operating system, wherein the application programming interface places the normal mode of operation module in the application during the normal mode of operation, and wherein the application programming interface places the critical mode of operation module in the application during the critical mode of operation.

* * * * *